United States Patent Office 3,159,534
Patented Dec. 1, 1964

3,159,534
DIALKYLPHOSPHINOTHIOATE PESTICIDAL COMPOSITIONS AND METHODS OF USE
Peter E. Newallis, Crestwood, and John P. Chupp and Joseph W. Baker, Kirkwood, Mo., assignors to Monsanto Company, a corporation of Delaware
No Drawing. Original application Jan. 8, 1960, Ser. No. 1,168, now Patent No. 3,061,613, dated Oct. 30, 1962. Divided and this application Jan. 29, 1962, Ser. No. 172,837
8 Claims. (Cl. 167—33)

This invention relates to new and useful dialkylphosphinothioates and to the methods of making same. Further this invention relates to insecticidal compositions comprising the new dialkylphosphinothioates as an active agent. Still further this invention relates to methods of combatting or controlling insects by supplying to their environment a lethal concentration of the new insecticidal agents of this invention.

The dialkylphosphinothioates of this invention can be termed O-(coumarinyl) dialkylphosphinothioates and which can be represented structurally as follows

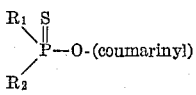

wherein $R_1$ and $R_2$ are like or unlike lower alkyl radicals (i.e., an alkyl radical containing from 1 to 5 carbon atoms such as methyl, ethyl, n-propyl, isopropyl, isobutyl, isoamyl, and the various isomeric forms thereof) but preferably alkyl radicals containing from 1 to 2 carbon atoms.

These new compounds can be prepared by reacting the appropriate acid halide of the structure

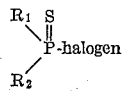

wherein $R_1$ and $R_2$ have the above described significance and wherein the term "halogen" means a halogen having an atomic number above 9 but not higher than 35 (i.e., chlorine or bromine, but preferably chlorine) with a substantially equimolecular proportion of a monohydroxy-substituted coumarin in an anhydrous medium in the presence of an inert organic liquid or solvent (e.g., acetone, methyl ethyl ketone, benzene, toluene, xylene, carbon tetrachloride, etc.) and a hydrogen halide scavenging agent (e.g., sodium carbonate, potassium carbonate, the tertiary organic amines such as triethylamine, tributylamine, dimethyl aniline, pyridine, lutidine, and the like) in an amount sufficient to absorb the hydrogen halide by-product. The hydrogen halide scavenging agent can be added in toto at the beginning of the reaction or throughout the course of the reaction. While any reaction temperature above the freezing point of the system and up to the boiling point of the system can be employed, it is preferred to employ a reaction temperature in the range of about 20° C. to about 120° C.

As illustrative of monohydroxy-substituted coumarin reactants contemplated by this invention are 8-hydroxycoumarin, 7-hydroxycoumarin (or umbelliferone), 4-hydroxycoumarin, 6-hydroxycoumarin, 4-methyl - 7 - hydroxycoumarin, 4-ethyl-7-hydroxycoumarin, 4-isopropyl-7-hydroxycoumarin, 4-methyl-6-hydroxycoumarin, 4-n-propyl-6-hydroxycoumarin, 3-methyl-7-hydroxycoumarin, 3,4 - dimethyl - 7 - hydroxycoumarin, 4,8-dimethyl-7-hydroxycoumarin, 6-methoxy-8-hydroxycoumarin, 3-ethoxy-4-hydroxycoumarin, 3 - (ethoxycarbonyl)-4-hydroxycoumarin, 3-(ethoxycarbonyl)-7-hydroxycoumarin and like monohydroxy-substituted courmarin of the general structure

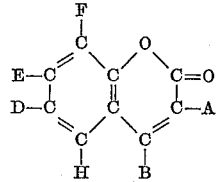

wherein A is hydrogen or R (alkyl) or OR (alkoxy) or

(alkoxycarbonyl) wherein R is an alkyl radical containing not more than 3 carbon atoms; wherein B is hydrogen or hydroxyl or R (alkyl) wherein R is an alkyl radical containing not more than 3 carbon atoms; wherein D is hydrogen or hydroxyl or OR (alkoxy) wherein R is an alkyl radical containing not more than 3 carbon atoms; wherein E is hydrogen or hydroxyl; wherein F is hydrogen or hydroxyl or R wherein R is an alkyl radical containing not more than 3 carbon atoms; wherein C is carbon; wherein H is hydrogen; wherein O is oxygen; and wherein but only one of B, D, E and F is hydroxyl. It is preferred that the substituent E be hydroxyl.

Of this new class of compounds the O-(coumarin-7-yl) dialkylphosphinothioates of the structure

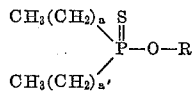

wherein $a$ and $a'$ are like or unlike numbers from 0 to 1 and wherein R is a 7-coumarinyl radical of the structure

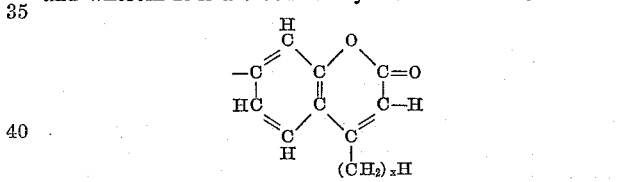

wherein C is carbon, wherein O is oxygen, wherein H is hydrogen, and wherein $x$ is a number from 0 to 3 inclusive, are particularly useful as systemic acaricidal (or miticidal) agents. As illustrative of members of this preferred group of compounds of this invention O-(coumarin-7-yl) dimethylphosphinothioate
O-(coumarin-7-yl) diethylphosphinothioate
O-(4-methyl-coumarin-7-yl) dimethylphosphinothioate
O-(4-methyl-coumarin-7-yl) diethylphosphinothioate
O-(4-ethyl-coumarin-7-yl) dimethylphosphinothioate
O-(4-n-propyl-coumarin-7-yl) dimethylphosphinothioate
O-(4-isopropyl-coumarin-7-yl) dimethylphosphinothioate
O-(4-methyl-coumarin-7-yl) methylethylphosphinothioate As illustrative of other phosphinothioates of this invention are the following:

O-(coumarin-7-yl) diisobutylphosphinothioate
O-(4-methyl-coumarin-7-yl) diisopropylphosphinothioate
O-(4,8-dimethyl-coumarin-7-yl) diethylphosphinothioate
O-(3,4-dimethyl-coumarin-7-yl) diethylphosphinothioate
O-(4-ethyl-coumarin-7-yl) diisoamylphosphinothioate
O-(4-methyl-coumarin-6-yl) diethylphosphinothioate
O-(6-methoxy-coumarin-8-yl) dimethylphosphinothioate
O-(3-ethoxy-coumarin-4-yl) dimethylphosphinothioate
O-(3-methoxycarbonyl-coumarin-7-yl) dimethylphosphinothioate The compounds of this invention are solids (usually white in color) soluble in acetone and benzene but insoluble in water. As illustrative of the preparation of the compounds of this invention but not limitative thereof is the following:

Example I

To a suitable reaction vessel equipped with a thermometer and agitator is charged approximately 18.1 parts by weight (substantially 0.104 mol) of 4-methyl-7-hydroxycoumarin and about 90 parts by weight of benzene. To this agitating mass at room temperature is added approximately 10.4 parts by weight (substantially 0.102 mol) of triethylamine. While maintaining the mix at about 25–28° C. there is slowly added approximately 12.8 parts by weight (substantially 0.10 mol) of dimethylphosphinothioic chloride dissolved in 25 parts by weight of benzene. While agitating the reaction mass is heated at 60–80° C. for about 8 hours. The reaction mass is then cooled to room temperature and washed with water and then filtered. The collected filter cake is then washed first with aqueous potassium hydroxide and then with water and then dried. The product, O-(4-methyl-coumarin-7-yl) dimethylphosphinothioate, is a white solid melting at 132–135° C. Analysis.—Theory: 11.2% P, 12.7% S. Found: 11.6% P, 11.9% S.

Example II

Employing the procedure of Example I but replacing 4 - methyl - 7 - hydroxcoumarin with an equimolecular amount of 7-hydroxy-coumarin there is obtained a white solid, O - (coumarin - 7 - yl) dimethylphosphinothioate (M.P. 155–157° C.). Analysis.—Theory: 12.6% S. Found: 12.2% S.

Example III

Employing the procedure of Example I but replacing 4-methyl-7-hydroxycoumarin with an equimolecular amount of 4-hydroxycoumarin there is obtained a white solid, O-(coumarin-4-yl) dimethylphosphinothioate (M.P. 130–131° C.). Analysis.—Theory: 12.6% S. Found: 12.4% S.

Example IV

Employing the procedure of Example I but replacing 4 - methyl - 7 - hydroxycoumarin with an equimolecular amount of 3-(ethoxycarbonyl)-4-hydroxycoumarin there is obtained white solid O-[3-(ethoxycarbonyl)-coumarin-4-yl] dimethylphosphinothioate (M.P. 131–134° C.).

Example V

Employing the procedure of Example I but replacing dimethylphosphinothioic chloride with an equimolecular amount of methylethylphosphinothioic chloride there is obtained white solid O-(4-methyl-coumarin-7-yl) methylethylphosphinothioate.

Example VI

Employing the procedure of Example I but replacing dimethylphosphinothioic chloride with an equimolecular amount of diethylphosphinothioic bromide there is obtained while solid O-(4-methyl-coumarin-7-yl) diethylphosphinothioate.

Example VII

Employing the procedure of Example I but replacing 4 - methyl - 7 - hydroxycoumarin with an equimolecular amount of 4,8-dimethyl-7-hydroxycoumarin there is obtained white solid O-(4,8-dimethyl-coumarin-7-yl) dimethylphosphinothioate.

The methods by which the phosphinothioates of this invention are isolated will vary slightly with the reactants employed and the product produced. Further purification by selective solvent extraction or by absorptive agents such as activated carbon, or clays, can precede the removal of the inert organic solvent. Additionally an inert organic solvent can be added to aid in the purification by adsorptive agents. However, the product is generally satisfactory as an insecticide without further purification.

It will be understood that the terms "insect" and "insecticide" are used herein in their broad common usage to include spiders, mites, ticks, and like pests which are not in the strict biological sense classed as insects. Thus the usage herein conforms to the definitions provided by Congress in Public Law 104, the "Federal Insecticide, Fungicide, and Rodenticide Act" of 1947, Section 2, subsection $h$, wherein the term "insect" is used to refer not only to those small invertebrate animals belonging mostly to the class Insecta, comprising six-legged, usually winged forms, as beetles, bugs, bees, flies, and so forth, but also to other allied classes of arthropods whose members are wingless and usually have more than six legs, as spiders, mites, ticks, centipedes and wood lice.

The phosphinothioates of this invention are effective against a wide variety of insect pests. As illustrative of the activity but not limitative thereof is the following:

One gram of O-(4-methyl-coumarin-7-yl) dimethylphosphinothioate was dissolved in sufficient acetone to make a concentrate solution thereof. Approximately 0.1 cc. of sorbitan monolaurate polyoxyethylene derivative (a commercial water-soluble non-ionic emulsifying agent) is then mixed with the concentrate. To this mixture and with agitation is added sufficient water to provide an aqueous emulsion having a concentration of 0.0015% by weight of O-(4-methyl-coumarin-7-yl) dimethylphosphinothioate. Thereupon lima bean plant leaves previously infested with the two-spotted spider mite, Tetranychus telarius (L.), are dipped in the aqueous emulsion, withdrawn, and set aside for observation. At the end of 48 hours a 100% kill of the mobile stages of the mite was noted. Seven days after setting the test specimen aside residual activity was confirmed, a 100% kill of both the resting stage and the ova stage being noted. Similar results against the mobile, resting and ova stages of the same mite are obtained employing instead of O-(4-methyl-coumarin-7-yl) dimethylphosphinothioate the following:

O-(4-methyl-coumarin-7-yl) diethylphosphinothioate and O - (4 - methyl - coumarin - 7 - yl) methylethylphosphinothioate.

Contact activity was also observed employing the compounds of this invention against the red flour beetle, e.g., a 100% kill was observed employing O-(4-methyl-coumarin-7-yl) dimethylphosphinothioate at a concentration of 0.5%.

Employing O-(4-methyl-coumarin-7-yl) dimethylphosphinothioate at a concentration of 0.016 p.p.m. against yellow fever mosquito larvae, Aëdes aegypti, a 100% kill was observed.

Contact activity was also observed against the southern armyworm, Prodenia eridania, employing the compounds of this invention.

Systemic activity was also observed against a wide variety of insects. For example against the two-spotted spider mite, Tetranychus telarius (L.), a 100% kill was observed employing O-(4-methyl-coumarin-7-yl) dimethylphosphinothioate and O-(4-methyl-coumarin-7-yl) diethylphosphinothioate, respectively, at a concentration of 0.01% by weight.

Although the phosphinothioates of this invention are useful per se in controlling a wide variety of insect pests, it is preferable that they be supplied to the pests or to the environment of the pest or pests in a dispersed form in a suitable extending agent.

In the instant specification and appended claims it is to be understood that the term "dispersed" is used in its widest possible sense. When it is said that the phosphinothioates of this invention are dispersed, it means that particles of the phosphinothioates of this invention may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g., pellets, granules, powders, or dusts. The term "dispersed" also includes mixtures which are suitable for use as aerosols including solutions, suspensions, or emulsions of the phosphinothioates of this invention in a carrier such as dichlorodifluoromethane and like fluorochloroalkanes which boil below room temperature at atmospheric pressure.

In the instant specification and appended claims it is to be understood that the expression "extending agent" includes any and all of those substances in which the phosphinothioates of this invention are dispersed. It includes, therefore, the solvents of a true solution, the liquid phase of suspensions, emulsions or aerosols, the semi-solid carrier of ointments and the solid phase of particulate solids, e.g., pellets, granules, dusts and powders.

The exact concentration of the phosphinothioates of this invention employed in combatting or controlling insect pests can vary considerably provided the required dosage (i.e., toxic or lethal amount) thereof is supplied to the pests or to the environment of the pests. When the extending agent is a liquid or mixture of liquids (e.g., as in solutions, suspensions, emulsions or aerosols) the concentration of the phosphinothioate employed to supply the desired dosage generally will be in the range of 0.001 to 50 percent by weight. When the extending agent is a semi-solid or solid, the concentration of the phosphinothioate employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared insecticidal spray or particulate solid. In such a concentrate composition, the phosphinothioate generally will be present in a concentration of 5 to 95 percent by weight, the residue being any one or more of the well-known insecticidal adjuvants, such as the various surface-active agents (e.g., detergents, a soap or other emulsifying or wetting agent, surface-active clays), solvents, diluents, carrier media, adhesives, spreading agents, humectants, and the like.

There are a large number of organic liquids which can be used for the preparation of solutions, suspensions or emulsions of the phosphinothioates of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g., those boiling almost entirely under 400° F. at atmospheric pressure and having a flash point above about 80° F., particularly kerosene), mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methylethyl ketone, diisobutyl ketone, dioxane, isopropyl ether, and the like. In certain instances, it is advantageous to employ a mixture of organic liquids as the extending agent.

When the phosphinothioates of this invention are to be supplied to the insect pests or to the environment of the pests as aerosols, it is convenient to dissolve them in a suitable solvent and disperse the resulting solution in dichlorodifluoromethane or like chlorofluoroalkane which boils below room temperature at atmospheric pressure.

The phosphinothioates of this invention are preferably supplied to the insect pests or to the environment of the insect pests in the form of emulsions or suspensions. Emulsions or suspensions are prepared by dispersing the phosphinothioates of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent" to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear, "Chemistry of Insecticides, Fungicides and Herbicides," second edition, page 280). These surfactants include the well-known capillary-active substances which may be anion-active (or anionic), cation-active (or cationic), or non-ionizing (or non-ionic) which are described in detail in volumes I and II of Schwartz, Perry and Berch's "Surface Active Agents and Detergents" (1958, Interscience Publishers, Inc., New York) and also in the November 1947, issue of Chemical Industries pages 811–824) in an article entitled "Synthetic Detergents" by John W. McCutcheon and also in the July, August, September and October 1952, issues of Soap and Sanitary Chemicals under the title "Synthetic Detergents." The disclosures of these articles with respect to surfactants, i.e., the anion-active, cation-active and non-ionizing capillary active substances, are incorporated in this specification by reference in order to avoid unnecessary enlargement of this specification. The preferred surfactants are the water-soluble anionic surface-active agents and the water soluble non-ionic surface-active agents set forth in U.S. 2,846,398 (issued August 5, 1958). In general it is preferred that a mixture of water-soluble anionic and water-soluble non-ionic surfactants be employed.

The phosphinothioates of this invention can be dispersed by suitable methods (e.g., tumbling or grinding) in solid extending agents either of organic or inorganic nature and supplied to the insect pest environment in particulate form. Such solid materials include, for example, tricalcium phosphate, calcium carbonate, kaolin, bole, kieselguhr, talc, bentonite, fuller's earth, pyrophyllite, diatomaceous earth, calcined magnesia, volcanic ash, sulfur and the like inorganic solid materials, and include, for example, such materials of organic nature as powdered cork, powdered wood, and powdered walnut shells. The preferred solid carriers are the adsorbent clays, e.g., bentonite. These mixtures can be used for insecticidal purposes in the dry form or, by addition of water-soluble surfactants or wetting agents the dry particulate solids can be rendered wettable by water so as to obtain stable aqueous dispersions or suspensions suitable for use as sprays.

For special purposes the phosphinothioates of this invention can be dispersed in a semi-solid extending agent such as petrolatum or soap (e.g., sodium stearate or oleate or palmitate or mixtures thereof) with or without the aid of solubility promoters and/or surfactants or dispersing agents.

In all of the forms described above the dispersions can be provided ready for use in combatting insect pests or they can be provided in a concentrated form suitable for mixing with or dispersing in other extending agents. As illustrative of a particularly useful concentrate is an intimate mixture of phosphinothioate of this invention with a water-soluble surfactant which lowers the surface tension of water in the weight proportions of 0.1 to 15 parts of surfactant with sufficient of the phosphinothioate of this invention to make 100 parts by weight. Such a concentrate is particularly adapted to be made into a spray for combatting various forms of insect pests (particularly mites) by the addition of water thereto. As illustrative of such a concentrate is an intimate mixture of 95 parts by weight of O-(4-methyl-coumarin-7-yl) dimethylphosphinothioate and 5 parts by weight of a water-soluble non-ionic surfactant such as the polyoxyethylene derivative of sorbitan monolaurate.

Another useful concentrate adapted to be made into a spray for combatting insect pests (particularly mites) is a solution (preferably as concentrated as possible) of a phosphinothioate of this invention in an organic solvent therefor. The said liquid concentrate preferably contains dissolved therein a minor amount (e.g., 0.5 to 10 percent by weight of the weight of the new insecticidal agent) of a surfactant (or emulsifying agent), which surfactant is also water-soluble. As illustrative of such a concentrate is a solution of O-(4-methyl-coumarin-7-yl) dimethylphosphinothioate in acetone which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well known water-soluble alkylaryl sulfonates such as sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of sorbitan.

In all of the various dispersions described hereinbefore for insecticidal purposes, the active ingredient can be one or more of the compounds of this invention. The compounds of this invention can also be advantageously employed in combination with other pesticides, including, for example, nematocides, fungicides, bactericides and herbicides. In this manner it is possible to obtain mixtures which are effective against a wide variety of pests and other forms of obnoxious life.

In controlling or combatting insect pests the phosphinothioates of this invention either per se or compositions comprising same are supplied to the insect pests or to their environment in a lethal or toxic amount. This can be done by dispersing the new insecticidal agent or insecticidal composition comprising means in, on or over an infested environment or in, on or over an environment the insect pests frequent, e.g., agricultural soil or other growth media or other media infested with the insect pests or attractable to the pests for habitational or sustenance or propagational purposes, in any conventional fashion which permits contact between the insect pests and the phosphinothioates of this invention. Such dispersing can be brought about by applying sprays or particulate solid compositions to a surface infested with the insect pests or attractable to the pests, as for example, the surface of an agricultural soil or other media such as the above ground surface of plants by any of the conventional methods, e.g., power dusters, broom and hand sprayers, and spray dusters. Also for sub-surface application such dispersing can be carried out by simply mixing the new insecticidal agent per se or insecticidal spray or particulate solid compositions comprising same with the infested environment or with the environment the insect pests frequent, or by employing a liquid carrier for the new insecticidal agent to accomplish sub-surface penetration and impregnation thereof therein.

While this invention has been described with respect to certain embodiments, it is to be understood that it is not so limited and that variations and modifications thereof obvious to those skilled in the art can be made without departing from the spirit or scope thereof.

This application is a division of copending application Serial No. 1,168, filed January 8, 1960, now U.S. No. 3,061,613.

What is claimed is:

1. The method of controlling insects which comprises contacting the insects with a toxic amount of a dialkyl phosphinothioate of the structure

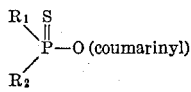

wherein $R_1$ and $R_2$ are lower alkyl.

2. The method of controlling mites which comprises contacting the mites with a toxic amount of a dialkyl phosphinothioate of the structure

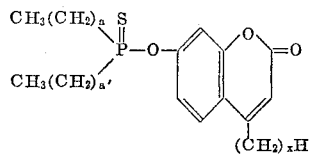

wherein $a$ and $a'$ are numbers from 0 to 1 and wherein $x$ is a number from 0 to 3, inclusive.

3. The method of controlling mites which comprises contacting the mites with a toxic amount of O-(4-methylcoumarin-7-yl) dimethyl phosphinothioate.

4. An insecticidal composition comprising a dialkyl phosphinothioate dispersed in an adsorbent clay, the said composition containing 0.1 to 25 percent by weight of said dialkyl phosphinothioate, the said dialkyl phosphinothioate having the structure

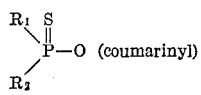

wherein $R_1$ and $R_2$ are lower alkyl.

5. An insecticidal composition comprising a dialkyl phosphinothioate dispersed in an adsorbent clay, the said composition containing 0.1 to 25 percent by weight of said dialkyl phosphinothioate, the said dialkyl phosphinothioate having the structure

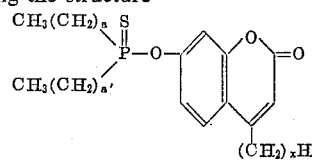

wherein $a$ and $a'$ are numbers from 0 to 1 and wherein $x$ is a number from 0 to 3, inclusive.

6. An insecticidal concentrate comprising a dialkyl phosphinothioate dispersed in an organic solvent therefor and having dissolved therein a minor amount of a water-soluble surfactant, the said concentrate forming an emulsion with water upon agitation therewith, the said dialkyl phosphinothioate having the structure

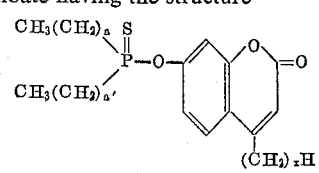

wherein *a* and *a'* are numbers from 0 to 1 and wherein *x* is a number from 0 to 3, inclusive.

7. An insecticidal concentrate adapted to be made into a sprayable composition by the addition of water comprising a dialkyl phosphinothioate in admixture with a water-soluble surfactant in the weight proportion of 0.1 to 15 parts of surfactant and sufficient of said dialkyl phosphinothioate to make 100 parts by weight, the said dialkyl phosphinothioate having the structure

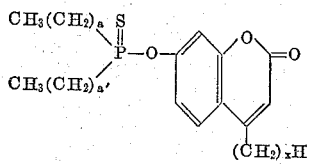

wherein *a* and *a'* are numbers from 0 to 1 and wherein *x* is a number from 0 to 3, inclusive.

8. The composition of claim 7 wherein the dialkyl phosphinothioate is O-(4-methyl-coumarin-7-yl) dimethyl phosphinothioate.

References Cited in the file of this patent

UNITED STATES PATENTS

| | | |
|---|---|---|
| 2,583,744 | Schrader et al. | Jan. 29, 1952 |
| 2,872,457 | Schroeder | Feb. 3, 1959 |
| 2,887,495 | Wilson | May 19, 1959 |
| 2,905,700 | Metivier | Sept. 22, 1959 |
| 2,906,661 | Baker | Sept. 29, 1959 |
| 2,911,335 | Gilbert | Nov. 3, 1959 |
| 3,067,210 | Schrader | Dec. 4, 1962 |